United States Patent
Gilbert et al.

(10) Patent No.: US 12,147,724 B2
(45) Date of Patent: Nov. 19, 2024

(54) INTERACTIVE KIOSK WITH DYNAMICALLY UPDATED TICKER

(71) Applicant: Ike Smart City, LLC, Columbus, OH (US)

(72) Inventors: Alan J. Gilbert, Westerville, OH (US); Lawrence A. Duarte, Arvada, CO (US); Paul J. Maffey, Arvada, CO (US)

(73) Assignee: IKE SMART CITY, LLC, Columbus, OH (US)

( * ) Notice: Subject to any disclaimer, the term of this patent is extended or adjusted under 35 U.S.C. 154(b) by 0 days.

(21) Appl. No.: 17/919,259

(22) PCT Filed: Apr. 16, 2021

(86) PCT No.: PCT/US2021/027833
§ 371 (c)(1),
(2) Date: Oct. 15, 2022

(87) PCT Pub. No.: WO2021/212078
PCT Pub. Date: Oct. 21, 2021

(65) Prior Publication Data
US 2023/0161534 A1     May 25, 2023

Related U.S. Application Data

(60) Provisional application No. 63/011,009, filed on Apr. 16, 2020.

(51) Int. Cl.
| | |
|---|---|
| *G06F 3/14* | (2006.01) |
| *G06F 3/0482* | (2013.01) |
| *G06F 3/0488* | (2022.01) |

(52) U.S. Cl.
CPC .............. *G06F 3/14* (2013.01); *G06F 3/0482* (2013.01); *G06F 3/0488* (2013.01)

(58) Field of Classification Search
CPC ........ G06F 3/14; G06F 3/0482; G06F 3/0488; E04H 1/14; G06Q 30/0241; G06Q 50/26; G06Q 50/30
See application file for complete search history.

(56) References Cited

U.S. PATENT DOCUMENTS

| | | | |
|---|---|---|---|
| 10,529,005 B2 * | 1/2020 | Smirin | ................... G06Q 20/18 |
| 2006/0048066 A1 | 3/2006 | O'Rourke | |

(Continued)

FOREIGN PATENT DOCUMENTS

| | | |
|---|---|---|
| CN | 103924798 A | 7/2014 |
| WO | 2014/066249 A1 | 5/2014 |

OTHER PUBLICATIONS

International Search Report and Written Opinion dated Jul. 21, 2021 from PCT Application No. PCT/US21/27833.

*Primary Examiner* — Sahlu Okebato
(74) *Attorney, Agent, or Firm* — Wentsler LLC

(57) ABSTRACT

Provided are a publicly-accessible kiosk and method for concurrently displaying content requested by a user and real-time transit information. The kiosk includes a base constructed for installation in a public setting at a geographic region, and an interface that is supportable by the base to receive user input corresponding to content requested to be presented by the kiosk. A control system including a computer processor executes computer-accessible instructions to access information stored by a non-transitory computer memory and, in response, generates an output based on the user input received. A display device is operatively connected to the control system to graphically display the content requested, presenting the content at the public setting based on the output of the control system. A programmable ticker dynamically displays real-time transit (Continued)

information for the geographic region where the kiosk is to be installed, and a second category of information.

14 Claims, 4 Drawing Sheets

(56) References Cited

U.S. PATENT DOCUMENTS

| | | |
|---|---|---|
| 2011/0222784 A1 | 9/2011 | Rowe et al. |
| 2016/0012465 A1* | 1/2016 | Sharp .................. G06Q 20/321 |
| | | 705/14.17 |
| 2017/0140680 A1* | 5/2017 | Kucksdorf ............ G09F 13/005 |
| 2021/0035156 A1* | 2/2021 | Doumar ............. G06Q 30/0246 |

* cited by examiner

INTERACTIVE KIOSK WITH DYNAMICALLY UPDATED TICKER

BACKGROUND OF THE INVENTION

1. Field of the Invention

This application relates generally to an interactive kiosk installed at a geographic location and, more specifically, to a kiosk and dynamic method of providing information services to pedestrians at a geographic location.

2. Description of Related Art

Conventional kiosks can be programmed to display information to onlookers. The information displayed can include advertisements about upcoming events, notifications, and other information. However, the information displayed is typically fixed, once programmed, or periodically changed according to a scheduled program.

Kiosks installed at outdoor locations within a city or other metropolitan region are often near landmarks. The kiosk can be used to display information about the landmarks on a primary display. However, the content displayed about nearby landmarks on the primary display of the kiosk is replaced with information specific to criteria input by a pedestrian while the kiosk is in use, or replaced with a defined cycle of advertisements or other content while the kiosk is not in use. As a result, the information about the landmarks may be concealed from public view during such times.

BRIEF SUMMARY OF THE INVENTION

According to one aspect, the subject application involves a kiosk that is publicly accessible. The kiosk includes a base constructed for installation in a public setting at a geographic region, and an interface that is supportable by the base to receive user input corresponding to content requested to be presented by the kiosk. A control system includes a computer processor that, as a result of executing computer-accessible instructions, causes the control system to access information stored by a non-transitory computer memory and generate an output based on the user input received. A display device is operatively connected to the control system to graphically display the content requested and present the content at the public setting based on the output of the control system. A programmable ticker dynamically displays real-time transit information for the geographic region where the kiosk is to be installed, and a second category of information. The kiosk interchangeably receives or includes the ticker and a placard, which is a static panel or sign that displays static content, once installed. In other words, the kiosk includes a mounting system that allows the ticker and the placard to be interchangeably installed in the kiosk. A border surface of a front panel, which is a surface through which a primary display device is visible, defines an aperture through which the ticker or the placard installed as part of the kiosk is viewable.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

BRIEF DESCRIPTION OF SEVERAL VIEWS OF THE DRAWING

The invention may take physical form in certain parts and arrangement of parts, embodiments of which will be described in detail in this specification and illustrated in the accompanying drawings which form a part hereof and wherein.

DETAILED DESCRIPTION OF THE INVENTION

Figure 1:
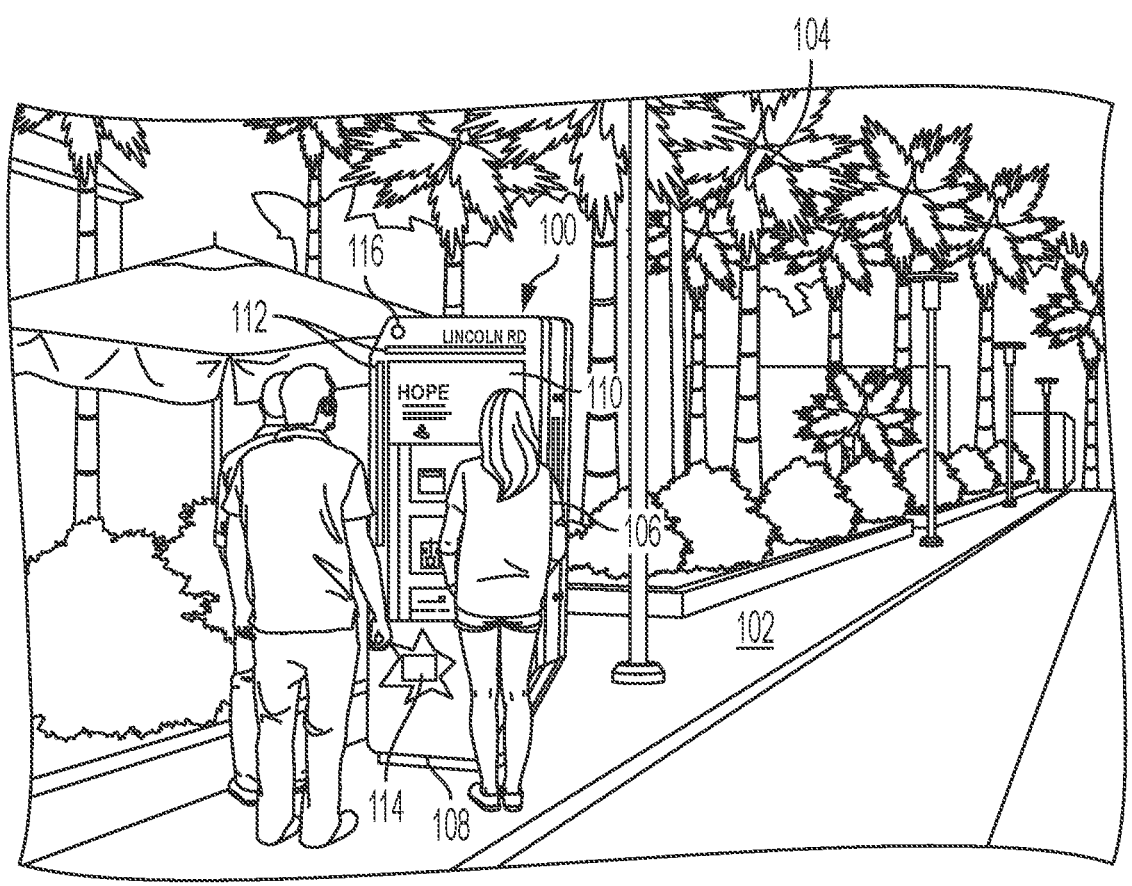
FIG. 1 shows an embodiment of a kiosk fixedly installed in a public, outdoor environment.

Certain terminology is used herein for convenience only and is not to be taken as a limitation on the present invention. Relative language used herein is best understood with reference to the drawings, in which like numerals are used to identify like or similar items. Further, in the drawings, certain features may be shown in somewhat schematic form.

It is also to be noted that the phrase "at least one of", if used herein, followed by a plurality of members herein means one of the members, or a combination of more than one of the members. For example, the phrase "at least one of a first widget and a second widget" means in the present application: the first widget, the second widget, or the first widget and the second widget. Likewise, "at least one of a first widget, a second widget and a third widget" means in the present application: the first widget, the second widget, the third widget, the first widget and the second widget, the first widget and the third widget, the second widget and the third widget, or the first widget and the second widget and the third widget.

The present technology is directed toward a publicly-accessible kiosk to be installed at a geographic location within a city or other municipality. The kiosk is publicly accessible to allow pedestrians to access content related to the geographic location where the kiosk is installed, optionally in addition to other content. An example of a publicly-accessible kiosk includes a base constructed for installation in the public setting, such as anchored in concrete or another surface forming walkways in the city or metropolitan region where the kiosk is to be installed. An interface is to be supported atop the base, to receive user input corresponding to content requested to be presented by the kiosk. A control system includes a computer processor that, as a result of executing computer-accessible instructions, causes the control system to access information stored by a non-transitory computer memory and generate an output based on the user input received. A display device is operatively connected to the control system to graphically display the content requested, presenting the content at the public setting based on the output of the control system. A programmable ticker is also operatively connected to the control system, to dynamically receive and display real-time transit information for the geographic region where the kiosk is to be installed, and a second category of information.

The kiosks may be installed in public settings, such as at outdoor locations throughout a city or metropolitan area for example, located along public transportation routes such as bus lines, rail lines, taxi stations, ride-share locations, etc. Such kiosks are operable to display real-time transit information indicating expected arrival times, delays, subsequent stops, etc. of transportation options at the geographic locations where the kiosks are installed. However, pedestrians using the kiosks may control the content displayed by a primary display device, which can hide transit information or otherwise prevent the transit information from being displayed by the primary display device.

The present kiosks can include a programmable ticker arranged separate from the primary display device of the kiosks. A control system is configured to independently control content displayed by the primary display device and the information displayed by the programmable ticker. To maintain the visibility of real-time transit information while the kiosk is in use, and a pedestrian has engaged the primary display device, the control system displays the real-time transit information using the programmable ticker, and optionally displays a second category of information.

The control system can receive updated transit information over a communication network in real time, reflecting delays, schedule changes, progress made by public transportation en route to the location adjacent to the kiosk, and other changes to the public transportation option(s) available at the location adjacent to the kiosk. Any such updated transit information can be displayed by the programmable ticker as the updated transit information is received.

The programmable ticker can optionally display more than one category of information. For example, the ticker can be controlled by the control system to toggle between operational states. In a first state, the ticker displays the real-time transit information, and in a second state the ticker displays a second category of information. An example of the second category of information includes, but is not limited to static information that is fixed for the geographic region, and identifies a portion of the geographic region where the kiosk is to be installed. More specifically, the information identifying the portion of the geographic region includes at least one of: a street name, a neighborhood name, and a transit stop (e.g., bus stop, rail station, etc.) name.

According to some embodiments, the ticker can also be operated in a third operational state in which an emergency notification is displayed. For example, emergency instructions can visually instruct onlooking pedestrians to take shelter from approaching inclement weather, include an AMBER alert notifying onlooking pedestrians of a missing person, or any other instructional or informational message pertaining to a current event.

With reference to the drawings, FIG. 1 shows a kiosk 100 installed along a sidewalk 102, in a public, outdoor environment 104, where the kiosk 100 can be accessed by pedestrians 106. Although FIG. 1 shows the kiosk 100 installed at an outdoor location, the kiosk can be installed at an indoor location, a quasi-indoor location (e.g., bus terminal, subway station, etc.), or any other publicly-accessible location encountered by pedestrians 106.

As shown, the kiosk 100 includes a base 108 fixedly installed to the underlying ground, which is the sidewalk 102 in FIG. 1. Being fixedly installed, the base 108 can be bolted or otherwise anchored to the ground, requiring the use of a tool offering a mechanical advantage to separate the base 108 from the ground without subjecting the base 108 to damage.

A display device 110 is supported by the base 108 at an elevation vertically above the sidewalk 102. Embodiments of the base 108 and display device 110 can include a bottom edge of the display device 110 supported at least fifteen (15 in.) inches above the sidewalk 102, for example. The display device 110 can optionally be supported by the base so the top edge of the display device 110 is at least thirty (30 in.) inches above the sidewalk 102, and up to forty-eight (48 in.) inches above the sidewalk 102. For example, the display device 110 can include a height that is at least twenty five (25 in.) inches tall, or at least thirty (30 in.) inches tall, or at least thirty five (35 in.) inches tall, or at least forty (40 in.) inches tall, etc. The height of the display device 110 provides sufficient screen area to display the requested content, and limits the footprint of the sidewalk 102 consumed by the kiosk 100.

The display device 110 can be configured as a touch-sensitive display device, forming an interface by which user input can be entered into the kiosk 100. For example, touch-sensitive circuitry 112 including one or more transparent electrodes can form an x-y grid of sensor pixels in a plane that is generally parallel with an external surface of the display device 110. Human contact with a region of the display device 110 influences a sensed electrical value in the vicinity of that region. The influence is detected by vertical and horizontal portions of the touch-sensitive circuitry 112 to pinpoint the location of the region that was contacted. A spatial relationship between content displayed by the display device 110 and the contacted region of the touch-sensitive circuitry 112 can be utilized by a control system 114, described below, that is operatively connected to the touch-sensitive circuitry 112 to provide context to the user input.

Although the embodiment of the interface is described above as a touch-sensitive display device, the present application technology is not so limited. Examples of other embodiments of the interface can optionally include at least one of a track ball, a track pad, and a keyboard.

A camera 116 (e.g., including a CMOS, CCD, etc. imaging sensor) can optionally be included as part of the kiosk 100. The camera can be trained on a region immediately in front of the kiosk 100, or on another region having a backdrop of interest. For example, a kiosk 100 installed within view of a landmark may include a camera 116 trained on that landmark. Pedestrians 106 can stand within the field of view of the camera 116, and have their photographs taken. The display device 110 can optionally display the field of view as a digital viewfinder, allowing the pedestrians 106 to properly position themselves within the photograph, relative to the landmark.

The photographs can be stored locally, in a non-transitory computer-readable medium 1005 (FIG. 4) connected to the control system 114, supported by the base 108. According to other embodiments, the photographs can be stored in a remotely-located, non-transitory computer-readable medium, by transmitting the photographs over a communication network. To limit the impact of transmitting photos on bandwidth available to the kiosk 100, transmission of the photos can occur at times when bandwidth usage is below a threshold, such as during the night, when few pedestrians are expected to interact the kiosk 100.

The control system 114 is operable to dynamically generate various graphical user interfaces such as menus, search interfaces, maps, and other content requested by pedestrians 106. According to one embodiment, the control system 114 can be a computing device 1000 or a computer 1015 forming a portion of the computing device 1000, as shown and described with reference to FIG. 4, for example, that generates content to be displayed by the display device 110 as the primary display. The display device 110 is referred to herein as the "primary" display device because it is the largest of the display devices provided to the kiosk 100, occupying a majority of the front face of the kiosk 100. It is also the central point of interaction that displays content requested by pedestrians 106 using the kiosk 100.

Figure 2:
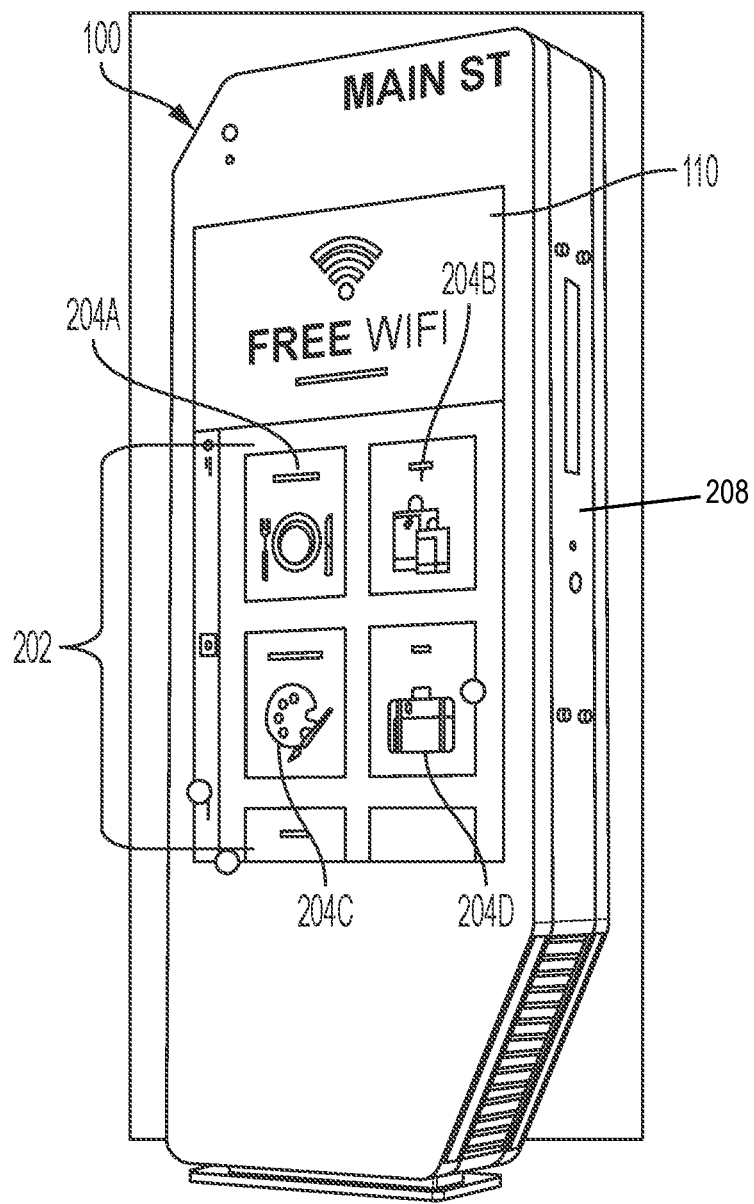
FIG. 2 shows an embodiment of a kiosk with a touch-sensitive display device displaying an interactive menu.

FIG. 2 shows an embodiment of the kiosk 100, with the display device 110 displaying an interactive menu 202. The menu 202 includes a plurality of icons, generally referred to at 204, each representing a different category of content that can be requested by a pedestrian 106 through the touch-sensitive display device 110 as the interface, for example. The menu 202 can optionally include all available icons 204, or can be scrollable, tabulated, or otherwise configured to allow hidden icons 204 that are not concurrently displayed on a single page to be made viewable.

The icons 204 of the embodiment of the kiosk 100 shown in FIG. 2 include a dining icon 204A. In response to receiving user input via the interface indicating a user selection of the dining icon 204A, the display device 110 can present a dining interface. For the present embodiments, and the description that follows, the interface will be described as a touch-sensitive display device 110 that receives user input as a result of the pedestrian 106 contacting the display device 110.

The dining interface can include information about local dining options in the vicinity of the geographic location of the kiosk 100. For example, a list of local dining options can be presented in an order of increasing distance from the kiosk. The order, and/or the local dining options displayed can optionally be user-definable. For example, the local dining options can be sorted based on at least one of: distance from the kiosk 100, user reviews, cost, etc. As another example, the local dining options displayed can be filtered based on at least one of: type of cuisine, cost, minimum review score, maximum distance from the kiosk 100, attire, etc., thereby limiting the number of local dining options displayed.

The local dining options displayed can optionally be obtained from a dining database, locally stored by the non-transitory computer-readable medium 1005 (FIG. 4) that is connected locally to the control system 114. Being locally connected allows the control system 114 to access and communicate with the non-transitory computer-readable medium 1005, even in the absence of a communication network connecting the kiosk 100 to a separate computer terminal. Information in the dining database can optionally be updated occasionally, such as by caching information received from a remotely-stored database over a communication network at times when such a network is available. Updates can also optionally be scheduled for times when network traffic is relatively low, compared to high-traffic times of day. The local dining options displayed can optionally be accompanied by information about the type of cuisine, and/or rating information indicating local dining reviews submitted by pedestrians or others who have dined at the respective local dining options. A refinement tool can optionally be provided to allow the pedestrians to filter the local dining options displayed according to at least one of: a desired cuisine, a minimum review threshold, a distance from the kiosk 100, and other options.

In response to receiving user input selecting one of the displayed dining options, a computer processor of the control system 114 executes computer-accessible instructions and, as a result, causes the control system 114 to access information related to dining options nearby stored by a non-transitory computer memory. The control system 114 generates an output based on the user input received and the output causes the display device 110 to graphically display the content requested (e.g., nearby dining options), presenting the content to the pedestrian 106 at the public setting of the kiosk 100. The local dining options, any other dining options 401 or other content retrieved by the control system 114 based on the user input, can optionally be retrieved or otherwise obtained from a website operated and/or hosted by, or on behalf of a third party.

Although dining options are described herein as an example of the content displayed by the display device 110, the present disclosure is not so limited. Entertainment options, landmark options, retail options, service locations, directions to a destination, any other content of interest in the geographic region where the kiosk 100 is installed, etc. are all examples of the content that can be displayed based on user input to the kiosk 100.

Another example of the output generated by the control system 114 includes a computer-readable code, such as the code described in U.S. patent application Ser. No. 16/747,929 to Gilbert et al., which is incorporated in its entirety herein by reference.

Figure 3A:
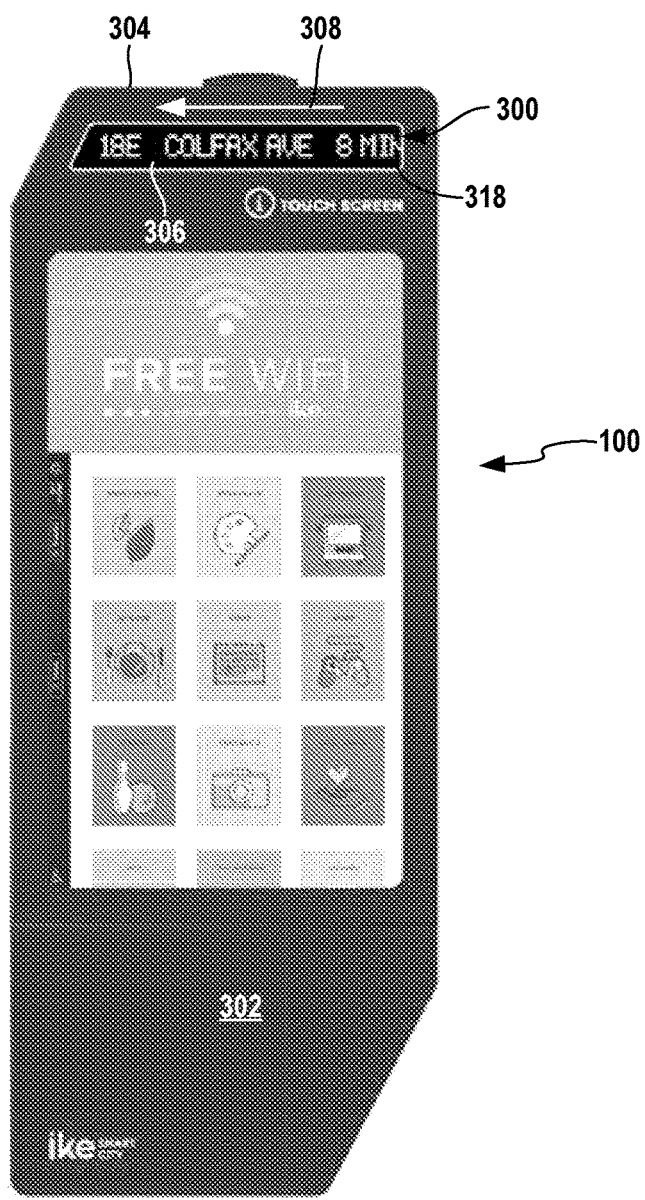
FIG. 3A shows an illustrative embodiment of a kiosk that includes a programmable ticker that dynamically displays real-time transit information for a geographic region where the kiosk is to be installed, and a second category of information.

FIG. 3A shows a front view of an illustrative embodiment of a kiosk 100 that includes a programmable ticker 300. As shown, the ticker 300 extends laterally, across a front face 302 of the kiosk 100, adjacent to a top 304 of the kiosk 100. Positioned adjacent to the top 304 of the kiosk 100, the ticker 300 is observable over a crowd of pedestrians 106. However, alternate embodiments of the ticker 300 can be arranged elsewhere on the kiosk 100 without departing from the scope of the present disclosure.

The ticker 300 includes a display device 306 such as a LED panel, an array of discrete LEDs that are selectively illuminated in sequence to visually display ticker content, or any other suitable electronic display device that dynamically displays real-time transit information for the geographic region where the kiosk 100 is installed, and a second category of information as described herein.

The ticker 300 is operatively connected to communicate with the control system 114 to receive the content to by displayed. For example, the control system 114 can communicate with a remote server over a communication network such as a cellular and/or public-interchange phone network, a local area network ("LAN") such as an 802.1x compliant network established under the Institute of Electrical and Electronics Engineers ("IEEE") or an Ethernet connection, a wide area network ("WAN") such as the Internet, or any combination thereof. Ticker content such as real-time transit information, emergency notifications, news feeds, or any other information to be displayed by the ticker 300 can be received over the communication network. At least a portion of the content received by the control system 114 can be transmitted by the control system 114 to the ticker 300 to be displayed.

Real-time transit information can be one or more of information relating to: (i) the arrival or status of public transportation at, or en route to a location adjacent to the kiosk 100, (ii) the arrival or status of private ride sharing hailed to the location adjacent to the kiosk 100; (iii) current traffic conditions within or near the geographic region where the kiosk 100 is installed; (iii) interruptions to public transportation available at the location adjacent to the kiosk 100; and other information relating to transportation available at or near the kiosk 100. As a specific example, the ticker 300 in FIG. 3A is shown displaying the estimated arrival time of bus "18E," with a final destination of "COLEFAX AVE," in "8 MIN." The transit information displayed can optionally appear as a sequence of fixed individual displays, scroll across the display device 306 in a direction generally indicated by arrow 308 from a right lateral side toward a left lateral side, or otherwise rendered by the display device 306. Based on this information displayed by the ticker 300, pedestrians 106 observing the kiosk 100 are informed that bus 18E is expected to stop near the kiosk 100 in approximately 8 minutes. This information can be displayed by the ticker 300 even while a pedestrian 106 is interacting with the primary display device 110, causing the display device 110 to display content other than transit information.

As another example of real-time transit information, the ticker 300 can display a delay of a bus or other form of transportation at or near the kiosk 100. If bus 18E in the preceding example was to be delayed by ten (10 min.) minutes, the ticker 300 can display a delay notification, or simply update the expected arrival time to indicate expected arrival in eighteen (18 min.) minutes instead of eight (8 min.) minutes.

Transit information transmitted to the control system 114 over the communication network can be updated in real time, as changes occur. For example, buses in a geographic region can be equipped with global position satellite ("GPS") sensors. The position of such busses can be triangulated based on data collected by the GPS sensors, and uploaded to a server or other terminal that relays the location of the busses to a router or other data distribution network to be conveyed to the control system 114 over the communication network. The location of the busses, the expected arrival time, or other real-time transit information can be reflected by the content displayed by the ticker 300.

As mentioned above, the ticker 300 can be toggled to operate in a second operational state in which the ticker 300 displays a second category of information, in addition to the real-time transit information displayed by the ticker 300 in a first operational state. For example, the second category of information can include static information, that is fixed for the geographic region, and is different than the transit information for the location adjacent to the kiosk 100. For example, the second category of information can identify a portion of the geographic region where the kiosk 100 is installed. More specifically, the static information can identify at least one of: the name of a street along which the kiosk 100 is installed (e.g., Mayfield Road), a neighborhood name (e.g., Little Italy); and a transit stop name (e.g., Cedar-University Rapid Station).

The static information in the second category of information is said to be static because it does not change for the geographic region where the kiosk 100 is installed. In other words, the name of a street, a neighborhood or a transit station does not commonly change on a daily basis, like a delay in a bus schedule during a busy commuting time. Static information, as used herein, does not necessarily require information in the second category to remain fixed or stationary on the ticker 300, although the static information can be presented as a fixed display by the ticker 300.

Figure 3B:
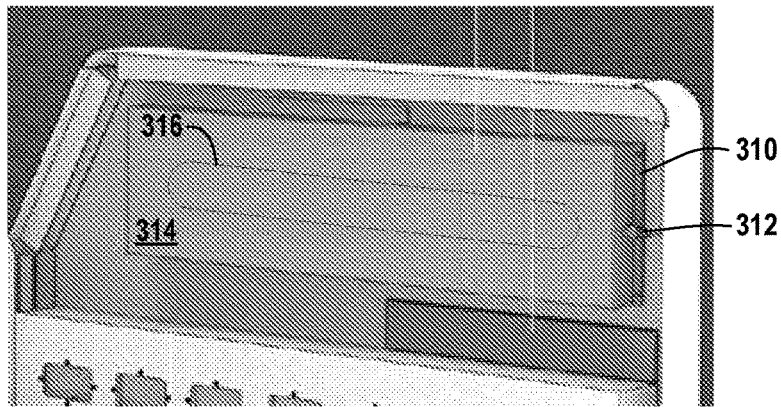
FIG. 3B shows a partially cutaway view of a portion of a kiosk revealing a mounting structure for interchangeably installing a programmable ticker and a static placard.

As shown in FIG. 3B, the display device 306 of the ticker 300 can be installed on the kiosk 100 by a mounting structure 310 such as a frame, for example, that couples the display device 306 to a housing of the kiosk 100. The mounting structure includes a releasable fastener 312 that is also compatible with a non-programmable placard 314 that displays fixed content. Accordingly, different model variants of the kiosk 100, a variant including the ticker 300 and a variant including the placard 314, can be assembled using a common mounting structure 310. The flexibility to assemble different model variants of the kiosk 100 to accept different configurations of a component (e.g., the ticker 300 and the placard 314) limits the number of unique components required to be warehoused.

Some embodiments of the placard 314 include a panel of material such as an acrylic, for example, including a first region formed from a transparent or translucent material and a second portion that is substantially-opaque. The placard 314 is visible through an aperture 318 (FIG. 3A) formed in a housing of the kiosk 100. Similarly, for model variants of the kiosk 100 that include the ticker 300 including the display device 306 installed instead of the placard 314, the display device 306 is secured in a location by the mounting structure 310 to be visible through the aperture 318. According to other embodiments, the mounting structure 310 can optionally have a different physical configuration to couple the ticker 300 and the placard 314 to the kiosk 100 to be visible through the aperture 318. Although the mounting structure 310 that couples the ticker 300 to the kiosk 100 is different from the mounting structure 310 that couples the placard 314 to the kiosk 100 is different, the ticker 300 or the placard 314, whichever is installed, is visible through the aperture 318 in the common front face 302 of the kiosk 100 used for both model variants. In other words, the ticker 300 that can be reprogrammed in situ, within the kiosk 100 and without being physically replaced, to display different content, and the placard 314, that displays static content and must be physically replaced to display different static content, can be interchangeably installed in the kiosk 100 to form different model variants of the kiosk 100. The same front face 302 including a border defining an aperture 318 can be installed on both model variants, for example, to allow the ticker 300 or placard 314, depending on which is installed, to be visible through the aperture 318, limiting manufacturing costs by employing common parts between the model variants.

The first portion can define words, symbols or other content to be illuminated by a backlight 316 (shown in hidden lines) within the kiosk 100 adjacent to the placard 314. Although the backlight 316 is shown behind the placard 314 in FIG. 3B, the backlight 316 can be arranged adjacent to a border of the placard 314 to edge-light the placard, or at any other location relative to the placard 314 to produce a desired visual effect. Such a placard 314 is not programmable, as the information the placard 314 conveys is fixed when the placard 314 is installed in the kiosk, requiring the placard 314 to be physically removed from the kiosk 100 and replaced by a new placard 314 to display different static content than the placard 314 being replaced. The placard 314 can present any of the static information described herein, including but not limited to a street name, neighborhood name, or transit stop, for example.

Computing Device Embodiment

Figure 4:
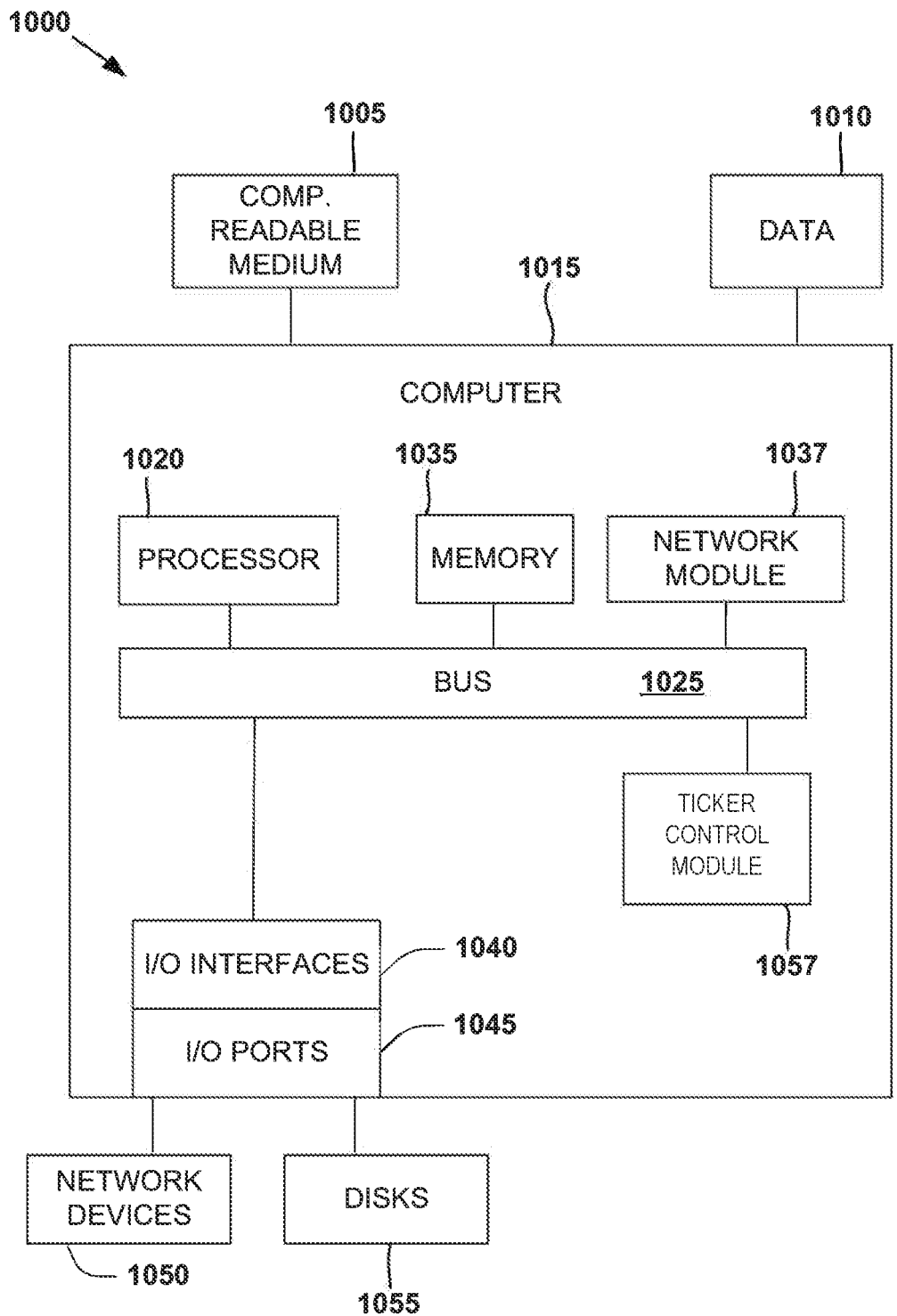
FIG. 4 illustrates an embodiment of a computing device configured as the illustrative embodiments of a kiosk and/or a portable electronic device described herein, and/or to perform various methods disclosed.

FIG. 4 illustrates an example of a computing device 1000 that is configured and/or programmed with one or more of the illustrative systems and methods described herein, and/or or equivalents. The illustrative embodiment of the computing device 1000 may include a computer 1015 that includes a computer processor 1020, a memory 1035, and input/output ports 1045 operably connected by a bus 1025. In one example, the computer 1015 may include ticker control module logic 1057 configured to generate the content displayed by the display device 306 of the ticker 300, and/or configured to implement and perform the methods described herein. In different examples, the logic 1057 may be implemented in hardware, a non-transitory computer-readable medium with stored instructions, firmware, and/or combinations thereof. While the logic 1057 is illustrated as hardware components attached to the bus 1025, it is to be appreciated that in other embodiments, the logic 1057 could be implemented in the computer processor 1020, stored in memory 1035, or stored in a non-transitory computer-readable medium 1005.

The computer 1015 may be implemented, for example, as an ASIC programmed to create generate and transmit emergency assistant requests as described herein. According to alternate embodiments, the technology for transmitting emergency assistance requests may also be implemented as stored computer executable instructions that are presented to the computer 1015 as data 1010 that are temporarily stored in memory 1035 and then executed by computer processor 1020.

Logic 1057 may also be embodied as hardware such as a non-transitory computer-readable medium that stores executable instructions, firmware, etc. When executed, the executable instructions perform a method of anonymously conveying content from a public kiosk to a private portable electronic device as described herein.

Generally describing an illustrative configuration of the computer 1015, the computer processor 1020 may be a variety of various processors including dual microprocessor and other multi-processor architectures. A memory 1035 may include volatile memory and/or non-volatile memory. Non-volatile memory may include, for example, ROM, PROM, and so on. Volatile memory may include, for example, RAM, SRAM, DRAM, and so on.

A storage disk 1055 may be operably connected to the computer 1015 via, for example, an input/output (I/O) interface (e.g., card, device) 1040 and an input/output port 1045. The disk 1055 may be, for example, a magnetic disk drive, a solid-state disk drive, a floppy disk drive, a tape drive, a Zip drive, a flash memory card, a memory stick, and so on. Furthermore, the disk 1055 may be a CD-ROM drive, a CD-R drive, a CD-RW drive, a DVD ROM, and so on. The memory 1035 can store a process and/or a data 1010, for example. The disk 1055 and/or the memory 1035 can store an operating system that controls and allocates resources of the computer 1015.

The computer 1015 may interact with input/output (I/O) devices via the I/O interfaces 1040 and the input/output ports 1045. Input/output devices may be, for example, a keyboard, a microphone, a pointing and selection device, cameras, video cards, displays, the disk 1055, the network devices 1050, and so on. The input/output ports 1045 may include, for example, serial ports, parallel ports, and USB ports.

The computer 1015 can operate in a network environment and thus may be connected to the network devices 1050 via the I/O interfaces 1040, and/or the I/O ports 1045. Through the network devices 1050, the computer 1015 may interact with a network. Through the network, the computer 1015 may be logically connected to remote computers. Networks with which the computer 1015 may interact include, but are not limited to, a LAN, a WAN, and other networks.

Definitions and Other Embodiments

In another embodiment, the described methods and/or their equivalents may be implemented with computer executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a computer processor, a computer, a server operating in a cloud computing system, and so on. In one embodiment, a computing device is implemented with one or more executable algorithms that are configured to perform any of the disclosed methods.

In one or more embodiments, the disclosed methods or their equivalents are performed by either: computer hardware configured to perform the method; or computer instructions embodied in a module stored in a non-transitory computer-readable medium where the instructions are configured as an executable algorithm configured to perform the method when executed by at least a processor of a computing device.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "alternate embodiment," "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

ASIC: application specific integrated circuit.
CD: compact disk.
CD-R: CD recordable.
CD-RW: CD rewriteable.
DVD: digital versatile disk and/or digital video disk.
LAN: local area network.
RAM: random access memory.
ROM: read only memory.
USB: universal serial bus.
WAN: wide area network.

"Computer-readable medium" or "computer storage medium", as used herein, refers to a non-transitory medium that stores instructions and/or data configured to perform one or more of the disclosed functions when executed. Data may function as instructions in some embodiments. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions.

"Logic", as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). Logical and/or physical communication channels can be used to create an operable connection.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims.

To the extent that the term "includes" or "including" is employed in the detailed description or the claims, it is intended to be inclusive in a manner similar to the term "comprising" as that term is interpreted when employed as a transitional word in a claim.

Illustrative embodiments have been described, hereinabove. It will be apparent to those skilled in the art that the above devices and methods may incorporate changes and modifications without departing from the general scope of this invention. It is intended to include all such modifications and alterations within the scope of the present invention. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A kiosk that is publicly accessible, the kiosk comprising:
   a base constructed for installation in a public setting at a geographic region, wherein the base is fixedly installed to the underlying ground in the public setting of the geographic region by being anchored to the ground;
   an interface that is supportable by the base, and receives user input corresponding to content requested to be presented by the kiosk;
   a control system comprising a computer processor that, as a result of executing computer-accessible instructions, causes the control system to access information stored by a non-transitory computer memory and generate an output based on the user input received;
   a display device operatively connected to the control system to graphically display the content requested, presenting the content at the public setting based on the output of the control system; and
   a mounting system that interchangeably couples to the kiosk: (i) a programmable ticker comprising a display that dynamically displays real-time transit information for the geographic region where the kiosk is to be installed, wherein the ticker is operable independently of the display device, and (ii) a placard that displays fixed content, and wherein the mounting system comprises a releasable fastener for releasably fastening the programmable ticker and the placard to the kiosk.

2. The kiosk of claim 1, wherein the programmable ticker is operatively connected to the control system such that the programmable ticker is configured to: (i) communicate with the control system to receive updated transit information over a communication network, and (ii) display the updated transit information in real time, wherein the updated transit information is displayed on the display of the programmable ticker.

3. The kiosk of claim 1, wherein the programmable ticker occupies a different region of the kiosk than the display device, and displays the real-time transit information independently of the display device, rendering the real-time transit information visible at a time when then display device is in use to display the content corresponding to the user input.

4. The kiosk of claim 1, wherein the programmable ticker is programmable to display a second category of information that comprises static information that is fixed for the geographic region and identifies a portion of the geographic region where the kiosk is to be installed.

5. The kiosk of claim 4, wherein the information identifying the portion of the geographic region comprises at least one of: a street name; a neighborhood name; and a transit stop name.

6. The kiosk of claim 4, wherein the programmable ticker comprises a plurality of operational states, and toggles between a first operational state in which the programmable ticker displays the real-time transit information and a second operational state in which the programmable ticker displays the second category of information such that:
   at a first moment in time, the programmable ticker is in the first operational state, and the display of the programmable ticker displays real-time transit information; and
   after the first moment in time passes, the programmable ticker toggles from the first operational state to the second operational state, and the display of the programmable ticker displays the static information that is fixed for the geographic region and identifies the portion of the geographic region where the kiosk is to be installed.

7. The kiosk of claim 1, wherein the programmable ticker comprises a scrolling display that displays text related to the real-time transit information for the geographic region where the kiosk is to be installed, with the text scrolling across the programmable ticker from a right lateral side to a left lateral side.

8. The kiosk of claim 1, wherein the real-time transit information comprises information indicative of an expected arrival of public transportation at a location adjacent to the kiosk.

9. The kiosk of claim 1, wherein the programmable ticker is operable in a second operational state to display a second category of information, wherein the second category of information comprises emergency instructions to be followed in response to receipt by the control system of an emergency transmission over a communication network.

10. The kiosk of claim 1, wherein the base supports a housing comprising a front face that defines: (i) a first aperture through which the display device is visible, and (ii) a second aperture through which a region of an interior of the kiosk where the mounting system interchangeably supports the programmable ticker or the placard is visible.

11. The kiosk of claim 10, wherein a configuration of the mounting system is suitable to interchangeably couple the programmable ticker and the placard to the kiosk to produce different model variants of the kiosk.

12. The kiosk of claim 1, further comprising a backlight attached to one or more of the base or the mounting system, the backlight positioned adjacent to the placard to illuminate the placard.

13. The kiosk of claim 3, wherein the programmable ticker is positioned adjacent to a top of the kiosk and above the interface and the display device, and wherein a top edge of the base is at least 30 inches above the ground.

14. A kiosk that is publicly accessible, the kiosk comprising:
   a base constructed for installation in a public setting at a geographic region, wherein the base is fixedly installed to the underlying ground in the public setting of the geographic region by being anchored to the ground;
   an interface that is supportable by the base, and receives user input corresponding to content requested to be presented by the kiosk;
   a control system comprising a computer processor that, as a result of executing computer-accessible instructions, causes the control system to access information stored by a non-transitory computer memory and generate an output based on the user input received;
   a display device operatively connected to the control system to graphically display the content requested, presenting the content at the public setting based on the output of the control system; and
   a mounting system comprising a releasable fastener and an aperture for interchangeably and releasably coupling to the kiosk one of: (i) a programmable ticker comprising a display that dynamically displays real-time transit information for the geographic region where the kiosk is to be installed, and (ii) a placard that displays fixed content, such that at a first moment in time, the releasable fastener of the mounting system couples the programmable ticker to the base while the placard is not coupled to the base, and at a second moment in time, the releasable fastener of the mounting system couples the placard to the base while the programmable ticker is not coupled to the base.

* * * * *